(12) United States Patent
Govindassamy

(10) Patent No.: US 10,536,921 B1
(45) Date of Patent: Jan. 14, 2020

(54) METHOD AND APPARATUS FOR PROVIDING LOCATION INFORMATION

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/478,855

(22) Filed: Apr. 4, 2017

(51) Int. Cl.
*H04W 24/00* (2009.01)
*H04W 64/00* (2009.01)
*H04W 4/06* (2009.01)

(52) U.S. Cl.
CPC .......... *H04W 64/003* (2013.01); *H04W 4/06* (2013.01)

(58) Field of Classification Search
CPC ..... H04W 8/183; H04W 36/30; H04W 64/00; H04W 4/02; H04W 4/14; H04W 88/08
USPC ........... 455/432.1, 436, 456.1, 456.2, 456.3, 455/456.5, 466, 561
See application file for complete search history.

(56) References Cited

U.S. PATENT DOCUMENTS

| 8,467,365 | B1 * | 6/2013 | Rai | ..................... H04W 56/006 370/324 |
| 9,220,060 | B2 * | 12/2015 | Xia | .................... H04W 52/0206 |
| 9,380,442 | B2 * | 6/2016 | Turtinen | ............... H04W 8/005 |
| 2002/0174175 | A1 * | 11/2002 | Zhu | .......................... H04L 12/14 709/203 |
| 2005/0054349 | A1 | 3/2005 | Balachandran et al. | |
| 2006/0007877 | A1 * | 1/2006 | Vaittinen | ............. H04W 76/064 370/328 |
| 2008/0151814 | A1 * | 6/2008 | Jokela | .................... H04W 74/04 370/328 |
| 2009/0270111 | A1 * | 10/2009 | Nakamura | ............ H04W 60/00 455/456.1 |
| 2009/0325538 | A1 * | 12/2009 | Sennett | ................ G08B 27/006 455/404.2 |
| 2011/0143784 | A1 * | 6/2011 | Ahluwalia | .............. H04W 4/12 455/466 |
| 2011/0239072 | A1 | 9/2011 | Cai | |
| 2012/0063383 | A1 * | 3/2012 | Barbieri | .............. H04W 72/082 370/315 |
| 2013/0005347 | A1 * | 1/2013 | Curticapean | .......... H04W 64/00 455/456.1 |
| 2013/0172005 | A1 * | 7/2013 | Finlow-Bates | ..... H04W 64/003 455/456.1 |
| 2013/0188626 | A1 | 7/2013 | Lakhzouri et al. | |

(Continued)

*Primary Examiner* — Matthew W Genack
(74) *Attorney, Agent, or Firm* — Lerner, David, Littenberg, Krumholz & Mentlik, LLP

(57) ABSTRACT

In some scenarios it may be useful for a client terminal to know the location of one or more base stations in a wireless communication network. While a network may know its location accurately, it may not necessarily provide that information to client terminals. Furthermore, the location information for a base station may be required before a client terminal can communicate with a particular base station. A method and apparatus are disclosed that enable one or more base stations to determine their respective locations and efficiently provide that information to client terminals in broadcast, multicast or unicast manner. A client terminal may use the base station location information for improved client terminal and network performance, improved user experience, and reduced power consumption.

21 Claims, 11 Drawing Sheets

(56) References Cited

U.S. PATENT DOCUMENTS

| | | | |
|---|---|---|---|
| 2014/0106793 A1* | 4/2014 | Lee .................. | H04W 68/12 |
| | | | 455/458 |
| 2014/0112325 A1 | 4/2014 | Calcev et al. | |
| 2014/0120874 A1* | 5/2014 | Kang ................ | H04W 12/04 |
| | | | 455/411 |
| 2014/0349688 A1 | 11/2014 | Liu et al. | |
| 2015/0312894 A1* | 10/2015 | Chen ................ | H04W 16/18 |
| | | | 370/329 |
| 2015/0332573 A1* | 11/2015 | Selmanovic ....... | H04L 67/1095 |
| | | | 455/457 |
| 2016/0044633 A1 | 2/2016 | Zhang et al. | |
| 2016/0242006 A1 | 8/2016 | Nagatoshi et al. | |
| 2017/0118592 A1* | 4/2017 | Patel ................. | H04W 4/021 |
| 2017/0280413 A1 | 9/2017 | Zhang et al. | |

* cited by examiner

METHOD AND APPARATUS FOR PROVIDING LOCATION INFORMATION

CROSS REFERENCE TO RELATED APPLICATIONS

This application is related to U.S. application Ser. No. 15/478,855 filed Apr. 4, 2017, the disclosure of which is hereby incorporated herein by reference.

BACKGROUND

As shown in FIG. 1, a wireless communication system 10 comprises elements such as client terminal or mobile station 12 and base stations 14. Other network devices which may be employed, such as a mobile management entity, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal may communicate with the base stations in only one direction, usually the DL. This may occur in applications such as paging.

The base station with which the client terminal is communicating is referred to as the serving base station. In some wireless communication systems the serving base station may be referred to as the serving cell. The terms base station and a cell may be used interchangeably herein. A cell from which a client terminal has already received service may be referred to as having visited that cell. In general, the cells that are in the vicinity of the serving cell are called neighbor cells. Similarly, in some wireless communication systems a neighbor base station may be referred to as a neighbor cell.

A cell may broadcast the essential information about it to enable the client terminals to get service from it. This essential information about a cell is referred to herein as System Information (SI). The SI may be organized into multiple units of information in the form of different SI messages. An SI message that includes the most frequently used information may be broadcast more frequently and an SI message with less frequently used information may be broadcast less frequently.

A wireless communication network may use multiple Radio Access Technologies (RAT) to provide service. For example, a network may use two or more of the RATs that include but not limited to: the 3rd Generation Partnership Project (3GPP) Long Term Evolution (LTE), the 3GPP Wideband Code division Multiple Access (WCDMA), Code Division Multiple Access (CDMA), the 3GPP Global System for Mobile (GSM), and the Institute of Electrical and Electronics Engineers (IEEE) 802.16. The coverage area of cells of two or more RATs belonging to the same network may overlap fully, or may overlap partly, or may be disjoint. In some cases the base stations for cells belonging to different RATs may be co-located.

Each base station may be identified by a unique identifier referred to herein as Cell Identity (CID). The CID of a base station may become known to a client terminal when it decodes SI from the base station. The CID may be of different types such as Cell Global Identity (CGI) in case of 3rd Generation Partnership Project (3GPP) Long Term Evolution (LTE) wireless communication system. A base station may have additional identities such as Closed Subscriber Group (CSG) identity.

When a client terminal is involved in active communication with the network, such as a voice/video call, text messaging, internet browsing, etc., the client terminal may be considered to be in Connected state. When a client terminal is not involved in active communication with the network, it may be considered to be in Idle state. When a client terminal is either in Connected state or in Idle state, it is considered to be receiving service from a cell. For example, in case of Connected state, receiving service may include engaging in a voice call. For example, in case of Idle state, receiving service may include receiving paging messages and/or SI messages. When transitioning from Idle state to Connected state and vice versa, a client terminal may be in some intermediate states. A client terminal periodically makes measurements on the serving cell and its neighbor cells in order to maintain continued service from the best possible cell. When a client terminal is mobile, it may switch from one cell to another to continue to get service. The switch from one cell to another when a client terminal in Connected state is referred to herein as handover. The switch from one cell to another when a client terminal in Idle state is referred to herein as cell reselection.

When a client terminal is in Idle state, it may periodically listen to the network for any paging messages that may be sent by the network, for example, if there is an incoming call for the client terminal. When a client terminal is in Idle state and mobile, it may perform cell reselection. To ensure that it continues to receive service from the network, it may need to inform the network that it has performed the cell reselection and that it is receiving service from a different cell. However, this may be wasteful from both the client terminal and network perspective. This is because most of the time, a client terminal may pass through a cell without ever getting into Connected state in that cell. However, a network may need to be able to reach a client terminal if there is any incoming communication, such as a call, for the client terminal. To avoid the unnecessary updates from the client terminal and yet ensure the ability to reach a client terminal at any given time, the network may organize a group of cells into a "tracking area" and use a Tracking Area Identity (TAI) to identify the various groups of cells. This is illustrated in FIG. 2 where four different tracking areas are illustrated. A cell may broadcast information about the tracking area it belongs to by including the TAI information in the SI. A client terminal may be required to inform the network when it begins to receive service from a cell that belongs to a tracking area that is different from the tracking area of the cells from which it was previously receiving service. The process of informing the network that the client terminal has begun receiving service from a cell that belongs to a new tracking area is referred to herein as Tracking Area Update (TAU) procedure. With this method, a client terminal performs TAU only when there is a change in TAI of the cell from which it is getting service. For example, in FIG. 2, when a client terminal reselects from the cell with CID=1003 to the cell with CID=1007 which has the same TAI, it may not perform TAU procedure. However, when the client terminal reselects from the cell with CID=1007 and TAI=200 to the cell with CID=1012 and TAI=201, it may perform TAU procedure.

Location determination is a commonly available and used capability in many client terminals in wireless communication networks. The terms location determination and positioning are used interchangeably herein. Client terminals may obtain their own location through different technologies. A satellite navigation system with global coverage commonly known as Global Navigation Satellite System (GNSS) and the Observed Time Difference of Arrival (OT-DOA) are two example technologies.

In some scenarios, it may be useful for a client terminal to know the location of one or more base stations in a wireless communication network. For example, a client terminal may make decisions about whether to make cell reselection and/or handover related measurements and system information decoding as well as how frequently to look for neighboring base stations based on the location information of the base stations.

While a network may know its location accurately, generally it may not provide that information to a client terminal. Furthermore, the location information for a base station may be required before a client terminal can communicate with the particular base station.

SUMMARY

A method and apparatus are disclosed that enable a wireless communication network to provide the location of relevant base stations to the client terminals. The method also enables the various base stations in a given area to exchange location information about each other. The base station location information may be used for improved performance of the network and client terminals, improved user experience, and reduced power consumption.

In accordance with an aspect of the present disclosure, a method for notifying first location information of a first base station of a wireless communication network, in which the network includes a plurality of base stations and the first base station is of the plurality of base stations, may include controlling, by a processing device at the first base station, determining the first location information of the first base station based on location determination information from a location determination device of the first base station; providing the first location information for communication to each other of the plurality of base stations in the network; and receiving, for the each other of the plurality of base stations, other location information respectively thereof.

In one alternative, the method may include controlling, by the processing device, transmitting the first location information over the network by broadcast, multicast, or unicast.

In one alternative, the first location information may be included in a System Information (SI) message when transmitted by broadcast.

In one alternative, the method may include controlling, by the processing device, when the first location information is transmitted by multicast, transmitting the first location information to predetermined client terminals of the network in a predetermined message having a predetermined periodicity and a predetermined logical channel, in which the predetermined message is configured such that the first location information is receivable and decodable only by the predetermined client terminals.

In one alternative, the method may include controlling, by the processing device, when the first location information is transmitted by unicast and a single predetermined client terminal receives service from the first base station, transmitting the first location information in a predetermined message addressing only the single predetermined client terminal.

In one alternative, when the first location information is transmitted by broadcast or multicast, the first location information may be transmitted in a predetermined message having a periodicity according to whether transmission of the first location information is by broadcast or multicast.

In one alternative, the method may include controlling, by the processing device, before transmitting the first location information, encrypting the first location information such that the encrypted first location information is decryptable only by predetermined client terminals in the network.

In one alternative, each of the plurality of base stations may be located in a predetermined tracking area and identified by a same Geographic Group Identity (GGID).

In one alternative, the method may include controlling, by the processing device, transmitting a unified common location information message including the first location information and the other location information respectively of the other of the plurality of base stations according to a predetermined schedule and channel resource of the first base station, wherein each of the other of the plurality of base stations is configured for transmitting the unified common location information message according to a respective other predetermined schedule and other channel resource thereof.

In one alternative, at least two of the plurality of base stations may have same or different Tracking Area Information (TAI).

In one alternative, the method may include controlling, by the processing device, transmitting a unified common location information message including the first location information and the other location information respectively of the other of the plurality of base stations, by broadcast, multicast or unicast, wherein the first base station is of a first subset of the plurality of base stations belonging to a first Radio Access Technology (RAT) and the plurality of base stations include another subset belonging to a second RAT.

In one alternative, the method may include controlling, by the processing device, transmitting the other location information respectively of the other of the plurality of base stations in a location information message not including the first location information of the first base station, by broadcast, multicast or unicast.

In one alternative, the method may include controlling, by the processing device, receiving a request message from a client terminal of the network including a request for the first location information, and transmitting a response message, responsive to the request message, (i) including the first location information or (ii) indicating the request is denied In one alternative, the receiving the request message and the transmitting the response message may be authenticated according to a protocol of a Radio Access Technology to which the first base station belongs.

In one alternative, a change mark indication as a Location Payload Change Mark Indication (LPCMI) indicating change of system information (SI) may be included with the unified common location information message or another predetermined message from the first base station.

In one alternative, each of the plurality of base stations may transmit the unified common location information message using a same LPCMI.

In one alternative, at least one of the base stations may belong to a Radio Access Technology (RAT) different from a RAT to which another of the base stations belongs.

In one alternative, second location information of a second base station of the plurality of base stations included in the unified common location information message may be received at the first base station via a core network of the network.

In one alternative, each of the plurality of base stations may be located in a predetermined tracking area and identified by a same Geographic Group Identity (GGID) and the plurality of base stations belong to different Radio Access Technologies (RATs), in which the first base station belongs to a first RAT, and the method further may include controlling, by the processing device, transmitting a unified common location information message including second location information respectively of second base stations of the plurality of base stations belonging only to the first RAT.

In one alternative, the method may include controlling, by the processing device, when the LPCMI is updated based on addition of a new base station to or removal of a given base station from the plurality of base stations having the same GGID, transmitting the updated LPCMI in a periodic essential message.

In one alternative, the method may include controlling, by the processing device, transmitting, to a client terminal of the network, the GGID and a given LPCMI in one of a common or other essential message.

In accordance with an aspect of the present disclosure, an apparatus for notifying first location information of a first base station of a wireless communication network, in which the network includes a plurality of base stations and the first base station is of the plurality of base stations, may include circuitry configured to control, at the first base station, determining the first location information of the first base station based on location determination information from a location determination device of the first base station; providing the first location information for communication to each other of the plurality of base stations in the network; and receiving, for the each other of the plurality of base stations, other location information respectively thereof.

In accordance with an aspect of the present disclosure, a wireless communication device may include a receiver to receive a wireless communication; and a processing device configured for notifying first location information of the wireless communication device as a first base station of a wireless communication network, in which the network includes a plurality of base stations and the first base station is of the plurality of base stations, wherein the processing device is configured to control determining the first location information of the first base station based on location determination information from a location determination device of the first base station; providing the first location information for communication to each other of the plurality of base stations in the network; and receiving, for the each other of the plurality of base stations, other location information respectively thereof.

DETAILED DESCRIPTION

Figure 1:
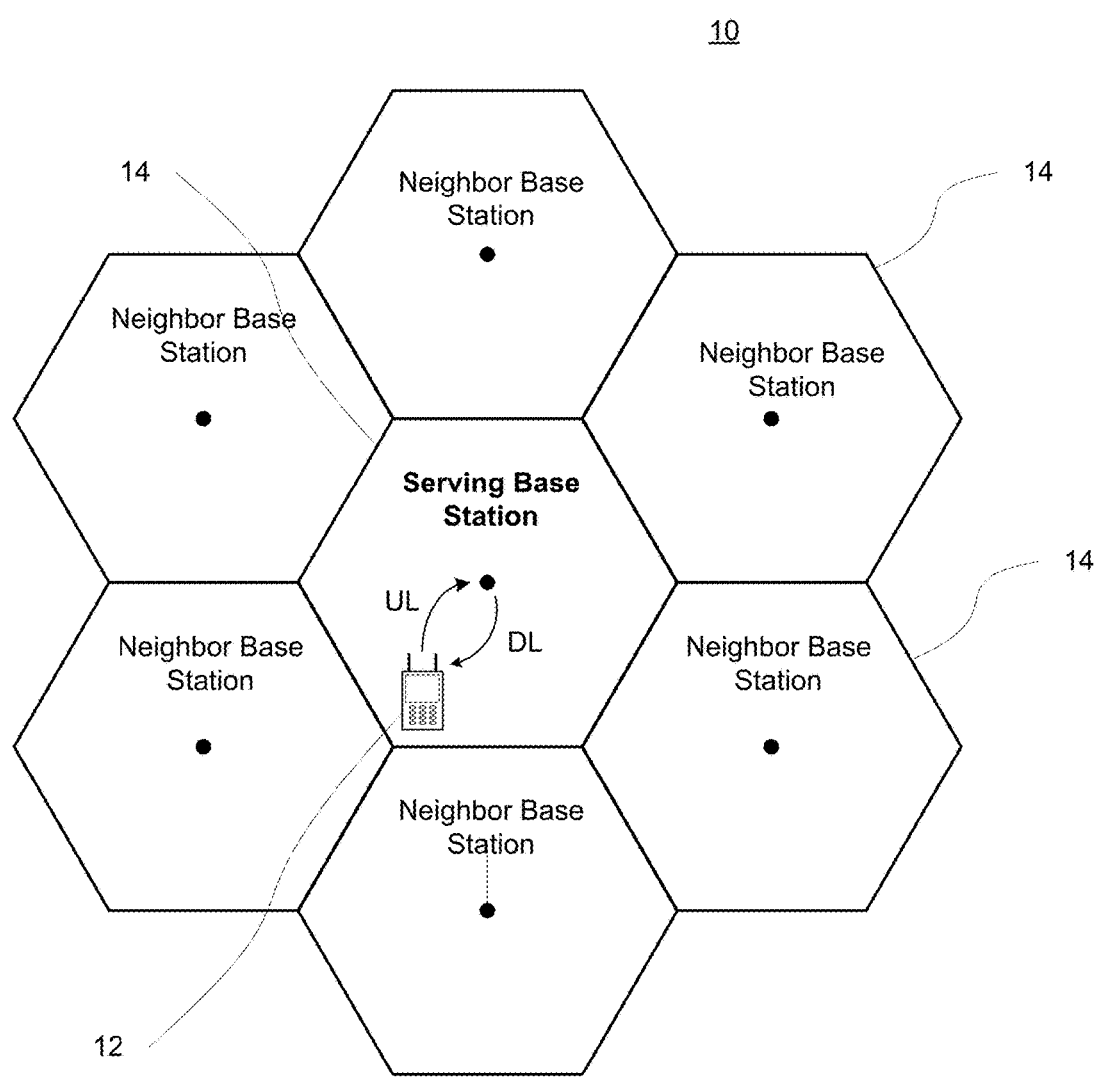
FIG. 1 illustrates a conventional mobile wireless communication system.
Figure 2:
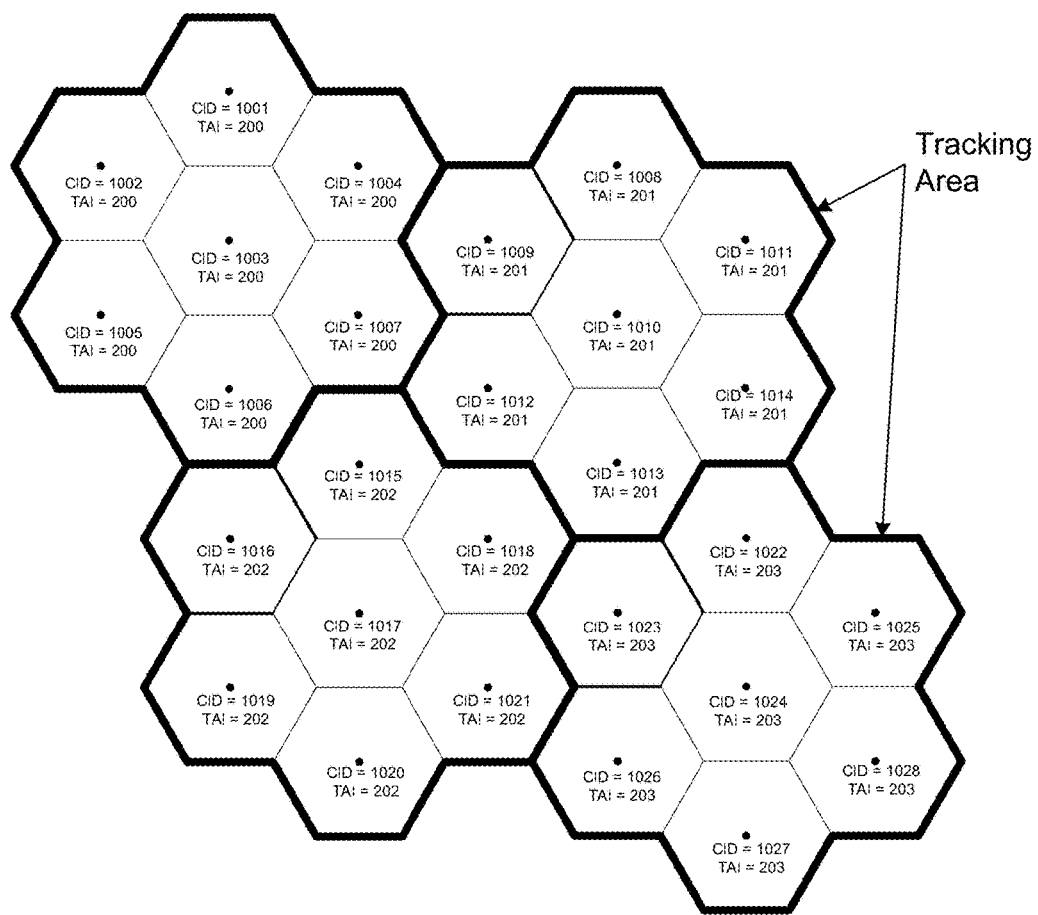
FIG. 2 illustrates the grouping of cells into tracking areas in a wireless communication system.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Figure 3:
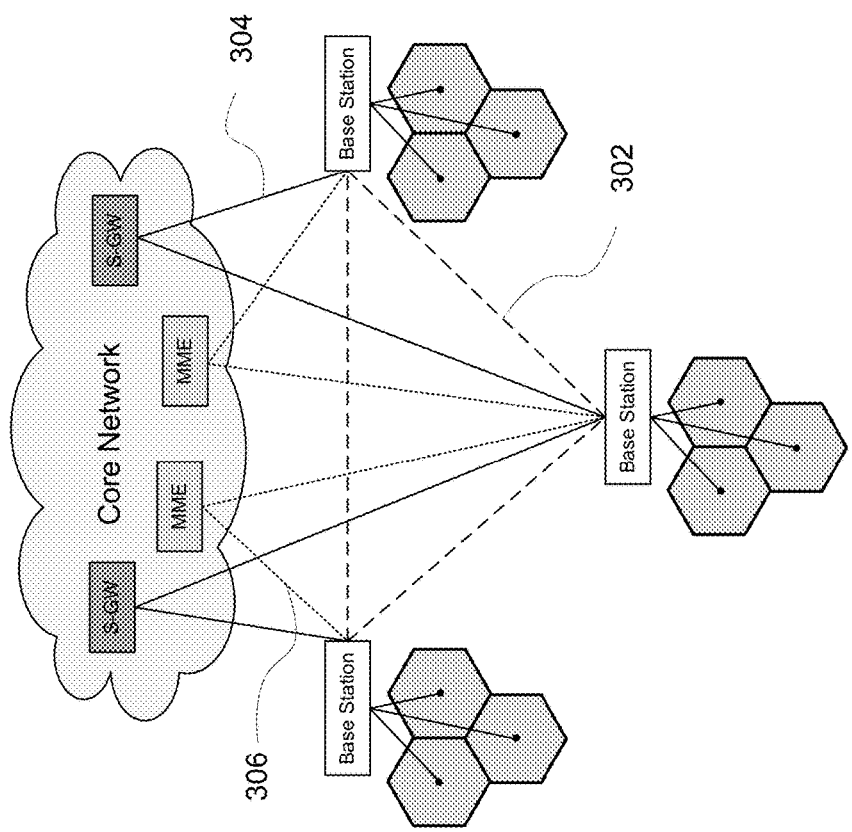
FIG. 3 illustrates the backhaul and core network portions of a wireless communication network.

According to an aspect of the present disclosure, some or all the base stations of a wireless communication network may be equipped with a GNSS or some other location determination system to enable it to determine its own location. According to an aspect of the present disclosure, since most of the base stations may be stationary in their deployed location and may not be mobile, the location information of the base stations may be determined one time and then may be configured into base stations or other elements of the wireless communication network. For example, a single GNSS receiver may be used to perform location determination for each base station and then the location information may be configured into each of the base station via existing backhaul and Core Network (CN) portion of the wireless communication network. For example, there may be wired or wireless links connecting all the base stations in a wireless communication network as shown in FIG. 3 using the interface links 302. The CN may communicate with the base stations using interface links 304 and/or 306. The CN may include a Mobility Management Entity (MME) and a Serving Gateway (S-GW). There may be multiple MME and S-GW entities in a CN as shown in FIG. 3. Once the location information for each base station is obtained, it may be communicated to every base station over the existing communication facilities of the backhaul and CN portion of the wireless communication network. All the base stations of a wireless communication network may be collectively referred to as the Radio Access Network (RAN). The CN and RAN are two main entities of a wireless communication network. The base stations may communicate with each other over the CN. The base stations may communicate with each other for various reasons such as handovers, radio resource management, etc.

In some cases, a base station may not be stationary. For example, in case of a sporting event, there may be temporary, portable base stations setup near the venue where the sporting event is being held. For such portable base stations, for example, a GPS receiver may be a part of the base station. This may enable the base station to determine its own current location. In another alternative, the current location of the portable base station may be determined by an external means and the location information may be configured into the base station.

According to an aspect of the present disclosure, some or all the base stations of a wireless communication network may broadcast, multicast, or unicast their respective location information. In case of broadcast, a base station may include the location information in one of its SI messages. In case of multicast, a base station may send its location information only to a select group of client terminals. In this case, the base station may define a new message, its periodicity and the logical channel in which the location information may be transmitted. The new message is defined such that only the a priori known group of client terminals may receive and decode the location information from the base station. In case of unicast, a base station may send the location information to only a single client terminal at a time in a message specifically addressing the client terminal when it gets service from the base station.

According to an aspect of the present disclosure, in case of broadcast or multicast, the periodicity of the location information message may be configurable. The periodicity of the messages may be determined by the network and may be indicated in other SI messages.

According to an aspect of the present disclosure, the base station may encrypt the location information before transmission such that only the authorized client terminals may be able to decrypt the received location information. Other unauthorized client terminals which may receive the location information may not be able to decrypt the location information transmitted by the base station. The authorized client terminals may obtain the decryption keys over the air as part of the registration with the network. According to an aspect of the present disclosure, the location information of the base stations received by a client terminal may be used by the internal protocol entities only, for the purpose of the network and client terminal performance enhancement. Specifically, the location information for the base stations may not be presented to the users of the client terminals.

Figure 4:
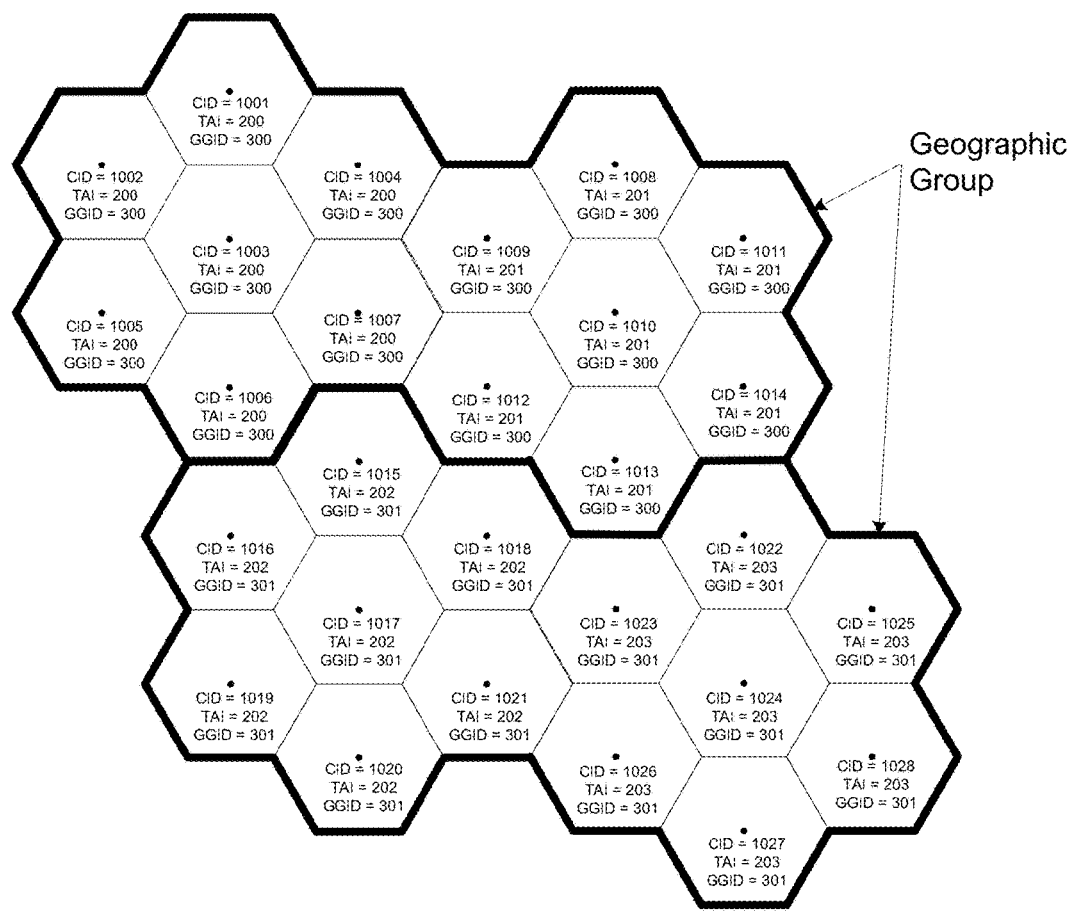
FIG. 4 illustrates one organization of cells into geographic groups in a wireless communication system.
Figure 5:
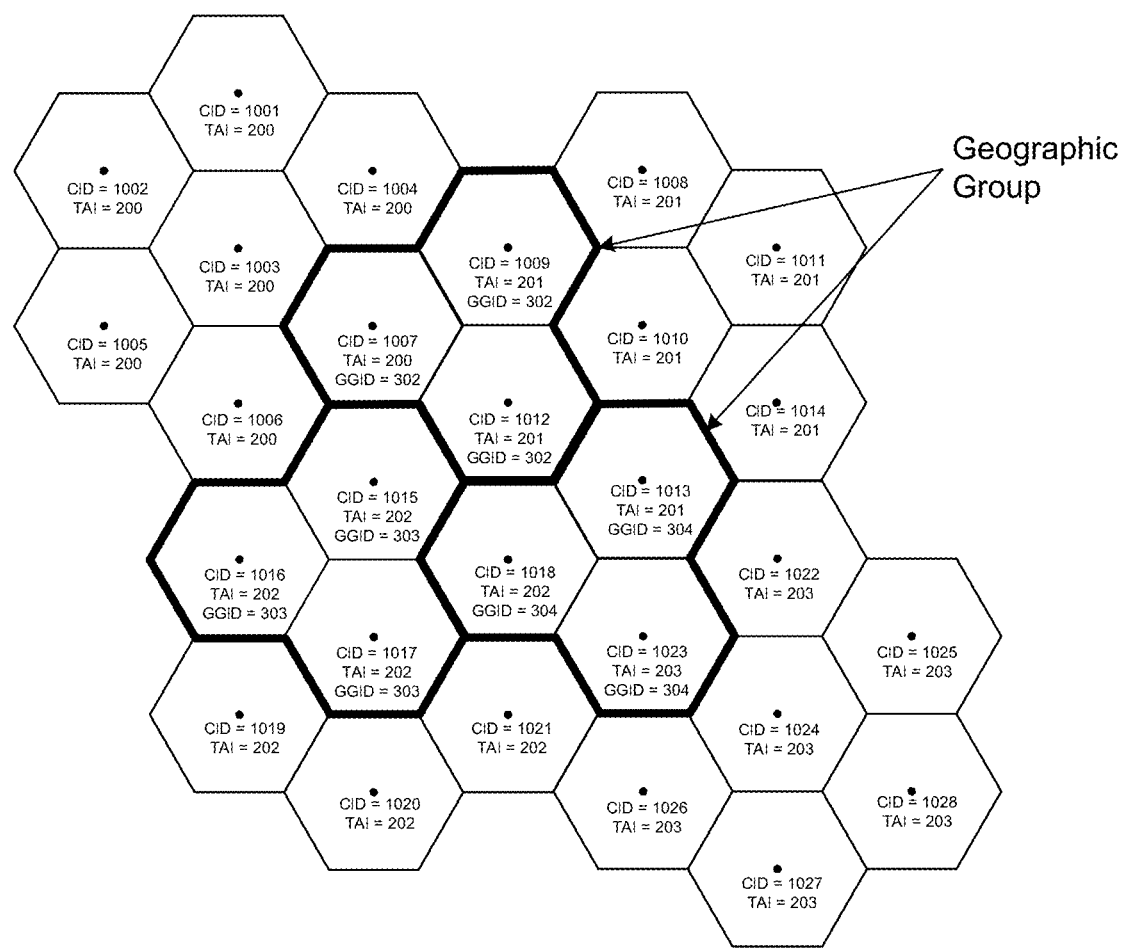
FIG. 5 illustrates another organization of cells into geographic groups in a wireless communication system.

According to an aspect of the present disclosure, the group of base stations in a particular geographic area (for example, tracking area) may exchange their location information with each other through CN to unify a common location information message which can carry the location information for all the base stations in the group. According to an aspect of the present disclosure, all the base stations in the same geographic area may be identified by a Geographic Group Identity (GGID). The network operator may determine the cells that may be considered to belong to the same geographic area based on a number of factors including but not limited to locations and network configuration considerations. According to an aspect of the present disclosure, all the base stations with the same GGID may broadcast, multicast, or unicast the same unified common location information message to the client terminals. The unified common location information message may be formed, for example, by the CN. According to an aspect of the present disclosure, each base station may send the unified common location information message according to its own schedule and according to its own channel recourses which may be different for different base stations. The cells with the same GGID may be also cells with the same TAI. However, such strict one to one association may not be required. A geographic area with the same GGID may be larger or smaller than the area covered by a tracking area. For example, all the cells with the TAI 200 and TAI 201 may form a single geographic area with a single GGID 300 and all the cells with the TAI 202 and TAI 203 may form a single geographic area with a single GGID 301 as illustrated in FIG. 4. Alternatively, for example in FIG. 5, cells with CIDs 1007, 1009, and 1012 may form a single geographic area with a single GGID 302. Similarly other GGIDs are illustrated in FIG. 5.

According to an aspect of the present disclosure, a subset of cells belonging to a particular RAT in a geographic location may share a unique GGID. According to another aspect of the present disclosure, subsets of cells belonging to different RATs may share a common GGID and may exchange their location information through CN. According to another aspect of the present disclosure, a cell belonging to one RAT may broadcast or multicast or unicast the location information of the cells belonging to other RATs. A unified common location information message payload for cells belonging to different RATs and with the same GGID in a particular geographic location may be formed by, for example, by the inter-RAT CN. According to an aspect of the present disclosure, the cells from different RATs and with the same GGID may broadcast, multicast, or unicast the unified location information message payload for cells belonging to different RAT and with the same GGID.

According to an aspect of the present disclosure, a cell may broadcast, multicast, or unicast the location information of other cells in a geographic location even though it may not include its own location information in the broadcast, multicast, or unicast location information message.

According to an aspect of the present disclosure, a client terminal may send a request message to a base station asking for its location information. The base station may send a response message with its location information to the client terminal. The base station may send a response message denying the location information request. The exchange of request from the client terminal and the response from the base station may be secured and authenticated as per the protocols of the respective RATs.

According to an aspect of the present disclosure, a client terminal may send a request message to a base station requesting location information for all the neighbor cells in a geographic location. According to another aspect of the present disclosure, a client terminal may request the location information for the cells from the same RAT and/or may request the location information for the cells from other RATs for a particular GGID. The base station may respond back to the client terminal with all the neighbor base station or some of the neighbor base station location information. The base station may send a response message denying the location information request. The client terminal may add one or more GGIDs in the request message for the location information from the base station. The base station may respond back with all the neighbor base station location information belonging to the requested GGIDs or some of the neighbor base station location information corresponding to some or all the requested GGIDs to the client terminal. The base station may send a response message denying the location information request. The exchange of request from the client terminal and the response from the base station may be secured and authenticated as per the protocols of the respective RATs.

Since the base station location information is not expected to change often, the creation and use of a single unified common location information message may be suitable for all cells with the same GGID. Different unified common location information messages containing the location information for cells may be used for each group of cells with the same GGID. Furthermore, a client terminal may be able to use the location information about the serving and neighbor base stations more effectively compared to the case where it has the location information only about its current serving cell. The unified common location information message for a GGID may include an identifier referred to herein as Version Indicator (VI). As long the content of the unified common location information message does not change, the VI may remain the same. Whenever any of the content of the unified common location information message changes for any reason, the VI may be incremented. The increment may be performed in modulo manner such that the VI cycles through fixed set of values. For example, the VI values may be 0, 1, 2, and 3. The VI may be included in certain messages that a client terminal may be decoding as part of its normal operation, for example, paging messages. Since the unified common location information message information is not expected to change frequently, a client terminal may detect a change in the VI before its value wraps around. Once a client terminal has decoded the unified common location information message for a particular GGID, it need not decode the same message again for that GGID until it detects a change of VI.

The SI normally may not change frequently. Therefore, a client terminal need not decode the SI unless it has changed. To enable a client terminal to determine whether the SI has changed or not, a Change Mark Indicator (CMI) may be used. The CMI may be included in SI and/or other messages that a client terminal may normally receive anyway. For example, a paging message may be decoded by a client terminal at regular intervals. If the CMI received in a paging message is the same as the CMI received earlier as part of the SI message, then it is an indication that the SI has not changed. According to an aspect of the present disclosure, the unified common location information may use the same common change mark indication, referred to herein as Location Payload Change Mark Indication (LPCMI). According to an aspect of the present disclosure, the LPCMI may be encoded as part of the unified common location information message and/or other messages from a base station, for example, the SI or paging messages. According to an aspect of the present disclosure, all the base stations in the same GGID may send the same payload with same LPCMI.

According to an aspect of the present disclosure, the base stations with the same GGID may belong to different RATs and they may send the same payload with the same LPCMI. In such a case, the payload may be a tunneled payload information that gets exchanged through the inter-RAT CN to the base station. The base stations in the GGID group may broadcast, multicast, or unicast the common location information payload which may carry the location information for the cells from different RATs.

According to another aspect of the present disclosure, the location information for base stations in the same GGID belonging to different RATs may be formed with unified common location information messages on a per RAT basis and for each RAT the payload may be unique and may carry only the RAT specific base station location information. For each RAT specific payload the LPCMI may be uniquely maintained. The base station may broadcast, multicast, or unicast one or more RAT specific location information message to the client terminals. The schedule and periodicity for broadcasting, multicasting, or unicasting the location information message for different RAT may be the same or may be different.

According to an aspect of the present disclosure, the LPCMI may be updated when there is a new base station added to the group or removed from the group with the same GGID. The update in the LPCMI may be sent in the periodic essential messages, such as paging message. According to an aspect of the present disclosure, the GGID and LPCMI may be sent in the common and other essential messages sent by the base stations to the client terminals which will notify the client terminals whether the base stations belongs to the same GGID and whether there is any change in the LPCMI.

According to an aspect of the present disclosure, a client terminal that is in the coverage area of base stations with the same GGID, if it receives the unified common location information message from one base station, it may store the location information (GGID, LPCMI, and location information of all the base stations in the group) and may avoid decoding the same unified common location information message from other base stations in the same GGID with the same LPCMI. According to an aspect of the present disclosure, the method of unified common location information message along with LPCMI and GGID may enable client terminals to reduce power consumption by not decoding the same location information repeatedly from other base stations until the client device moves out of a geographic area with the same GGID.

Figure 6:
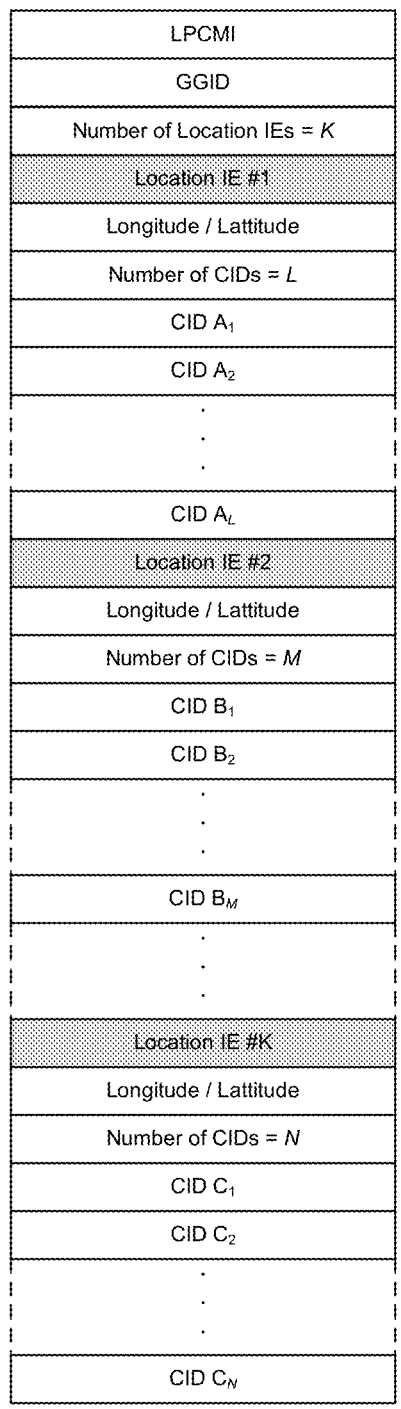
FIG. 6 illustrates the structure of the unified common location information message according to the aspects of the present disclosure.

In some cases, more than one cell may have the same location. For example, three different sectors of a cell may be seen by client terminals as different cells but the base stations for those cells may be co-located with the same location information. In another example, a single base station may provide communication over multiple channels from the same location. In such a case, according to an aspect of the present disclosure, the encoding of location information may be such that the payload size of the location information message may be minimized. For example, a single location may be associated with multiple CIDs. An example of unified common location information message encoding is illustrated in FIG. 6. The first entry in the message format shows the LPCMI followed by the GGID. Next the number of Location Information Elements (IEs) present in the message is provided. As illustrated in the example case, there may be total of K Location IEs in a single unified common location information message. In the present example, there are K Location IEs. Each Location IE may include the location information, for example, the latitude and longitude. This may be followed by a number indicating the number of cells with the same location information. This may be followed by the CIDs of all the cells that have the same location information, i.e., co-located or quasi co-located cells. In the example shown, for the first location IE, there may be L different cells with the same location information. In the example shown, for the second Location IE, there may be M different cells with the same location information. Each Location IE may have the same or different number of CIDs associated with each location information.

Figure 7:
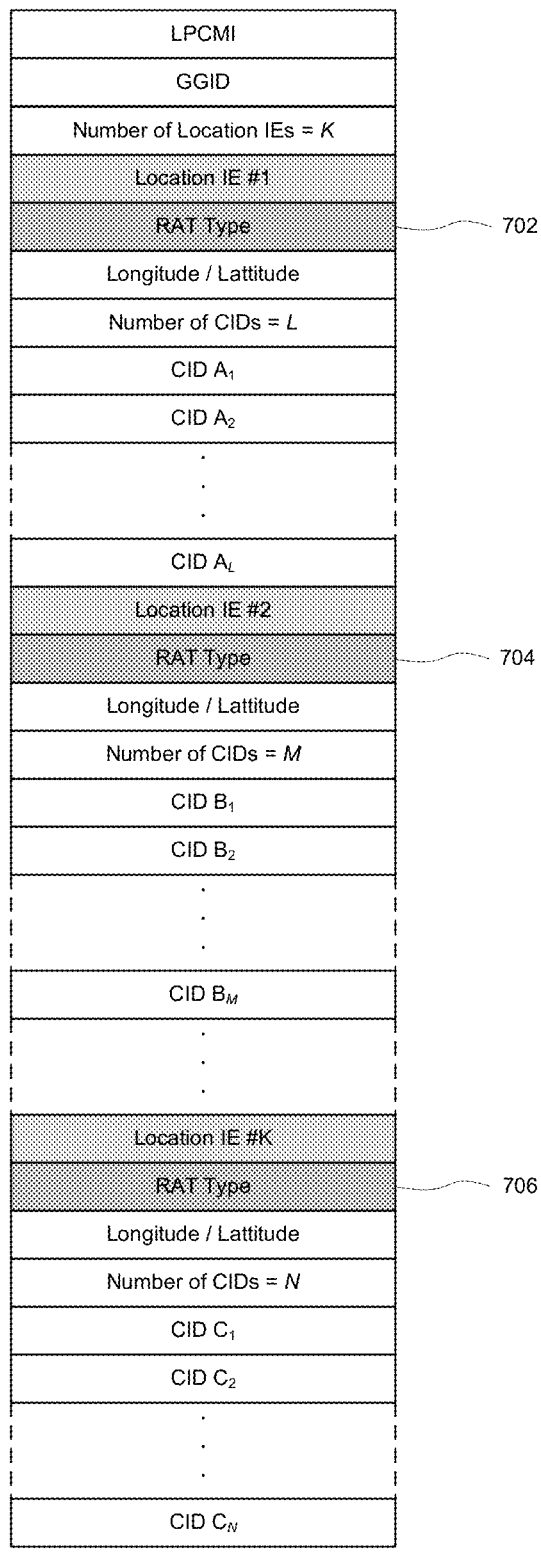
FIG. 7 illustrates the structure of the unified common location information message for multiple Radio Access Technology (RAT) network according to the aspects of the present disclosure.
Figure 8:
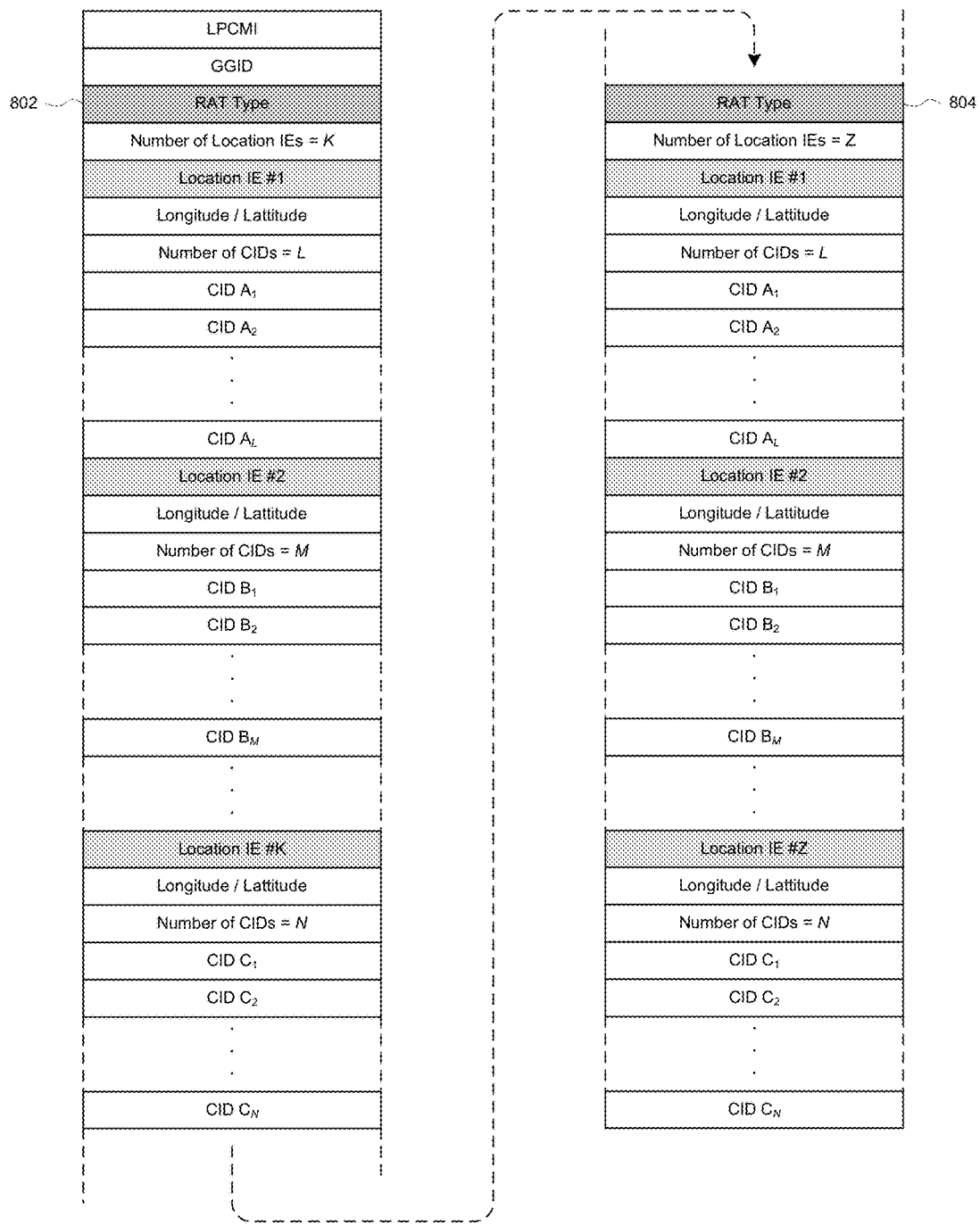
FIG. 8 illustrates an alternate structure of the unified common location information message for multiple Radio Access Technology (RAT) network according to the aspects of the present disclosure.

An example of unified common location information message encoding in case of a multi-RAT network is illustrated in FIG. 7. In this message format, the RAT Type field 702, 704 and 706 are included immediately after each Location IE field. Another example of unified common location information message encoding in case of a multi- RAT network is illustrated in FIG. 8. In this message format, the RAT Type field 802 and 804 are included only once for a group of cells that belong to the same RAT and then after each RAT Type IE, individual Location IEs follow.

The aspects of the present disclosure may be applicable in networks deployed with different network topologies. For example, a wireless communication network may be deployed as a homogeneous macro cellular network. In another example, a wireless communication network may be a hierarchical network with macro cells and micro cells where macro cells may serve as umbrella cells for providing wide coverage area and at the same time micro cells may serve densely populated client terminals. A further hierarchical network may include femtocells and relays which may provide indoor coverage. The organization of cells into geographic areas may be adapted accordingly. For example, a cell may belong to one or more geographic areas in case of hierarchical deployments.

By way of example only, the above-described method may be implemented in network device such as a base station of a wireless communication network illustrated in FIG. 1.

Figure 9:
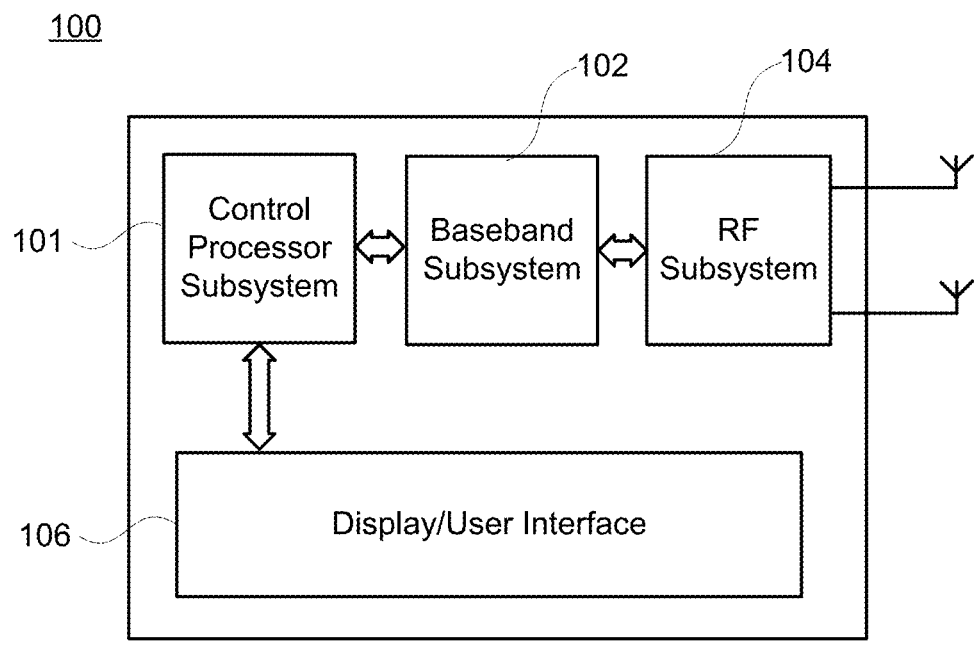
FIG. 9 illustrates a base station diagram, which may be employed with aspects of the disclosure described herein.

As shown in FIG. 9, Base Station 100 may include a control processor subsystem 101, baseband subsystem 102 and a radio frequency (RF) subsystem 104 for wireless transmission and reception. A display/user interface 106 provides information to and receives input from the network administrator. By way of example, the user interface may include one or more displays, keyboards, serial and parallel interfaces. In some base stations, certain combination of the control processor subsystem 101, the baseband subsystem 102 and the RF subsystem 104 may be combined as one integrated chip.

Figure 10:
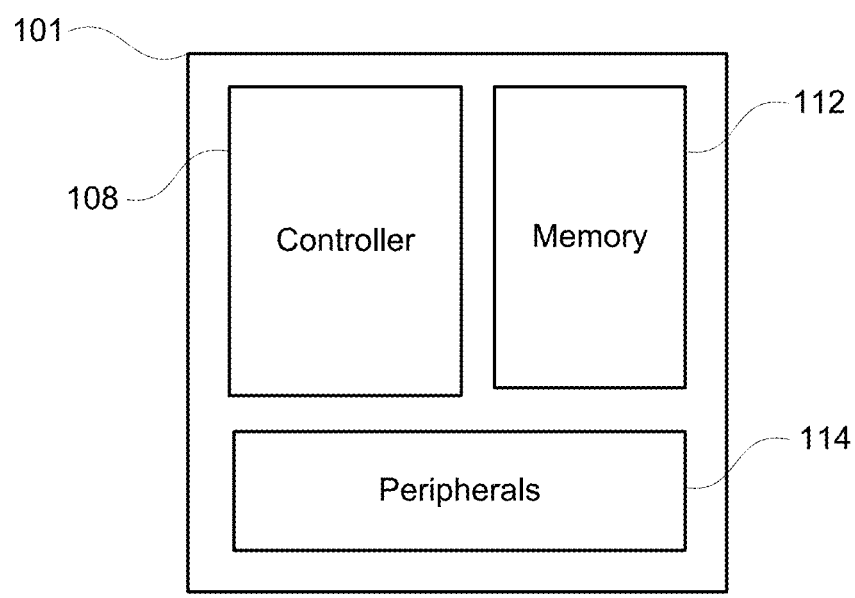
FIG. 10 illustrates a control processor subsystem for a base station, which may be employed with aspects of the disclosure described herein.
Figure 11:
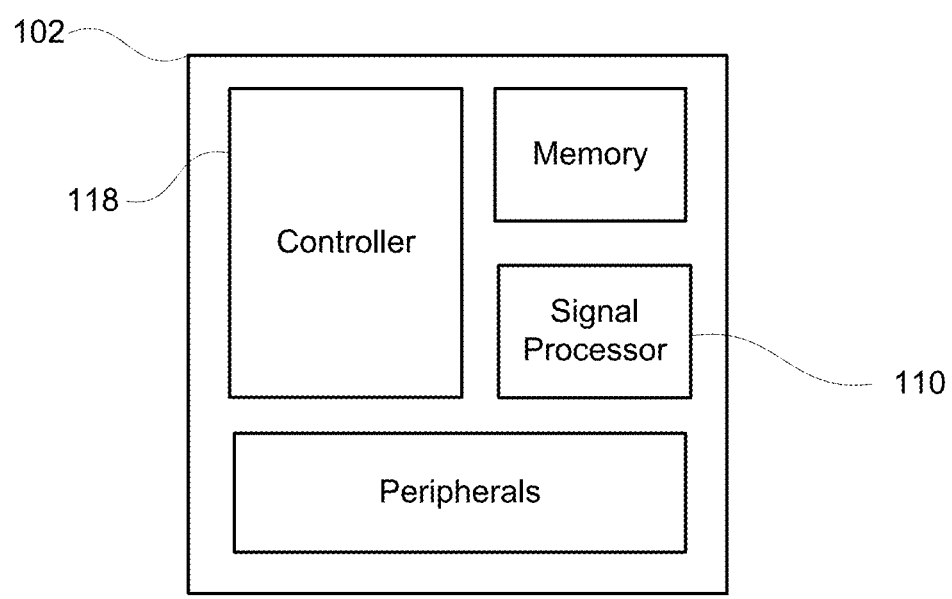
FIG. 11 illustrates a baseband subsystem for a base station, which may be employed with aspects of the disclosure described herein.
Figure 12:
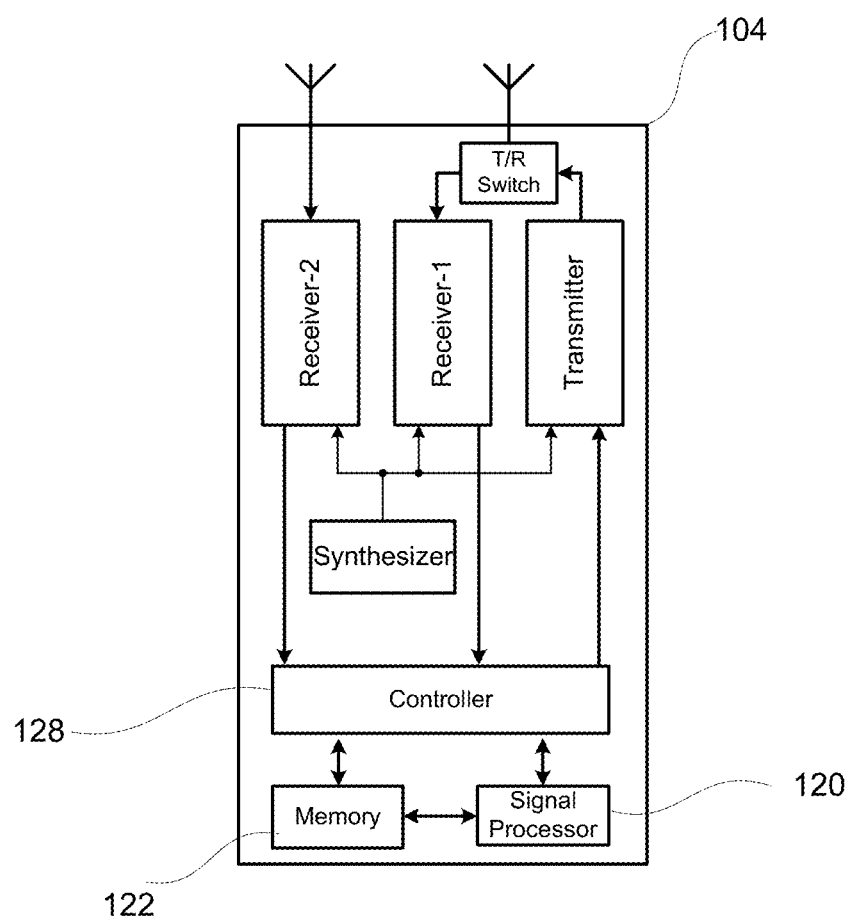
FIG. 12 illustrates a Radio Frequency (RF) subsystem for a base station, which may be employed with aspects of the disclosure described herein.

The control processor subsystem 101 as shown in FIG. 10 may include a controller 108 such as a microcontroller, another processor or other circuitry. The baseband subsystem 102 as shown in FIG. 11 may include a controller 118 such as a microcontroller or other processor. The RF subsystem 104 as shown in FIG. 12 may include a controller 128 such as a microcontroller, another processor or other circuitry. The controller 108 in FIG. 10 desirably handles overall operation of the base station 100. This may be done by any combination of hardware, software and firmware running on the controller 108. Such a combination of hardware, software and firmware may embody any methods in accordance with aspects of the present disclosure.

In FIG. 10, the Peripherals 114 such as a full or partial keyboard, video or still image display, audio interface, etc. may be employed and managed through the controller 108.

Aspects of the present disclosure may be implemented in firmware of the controller 108 of the control processor in FIG. 10 and/or the controller 118 of the baseband subsystem in FIG. 11. In another alternative, aspects of the present disclosure may also be implemented as a combination of firmware and hardware of the control processor subsystem 101 of FIG. 10 and/or the baseband subsystem 102 of FIG. 11. For instance, a signal processing entity of any or all of the FIG. 11 may be implemented in firmware, hardware and/or software. It may be part of the baseband subsystem, the receiver subsystem or be associated with both subsystems. In one example, the controller 118 and/or the signal processor 110 in FIG. 11 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for notifying first location information of a first base station of a wireless communication network, in which the network includes a plurality of base stations and the first base station is of the plurality of base stations, the method comprising:

controlling, by a processing device at the first base station,
determining the first location information of the first base station based on location determination information from a location determination device of the first base station;
providing the first location information for communication to each other of the plurality of base stations in the network;
receiving, for the each other of the plurality of base stations, other location information respectively thereof; and
transmitting a same unified common location information message including the first location information and the other location information respectively of the other of the plurality of base stations, according to a predetermined schedule and channel resource of the first base station, in which the same unified common location information message indicates (i) a number K of Location Information Elements (IEs) within the same unified common location information message, each of the Location IEs indicating the position of a base station, and (ii) each of the Location IEs being associated with (a) given geographic location information corresponding to the each Location IE and (b) a number L of cells corresponding to the each Location IE and having the same given geographic location information, wherein the same unified common location information message identifies at least one radio access technology (RAT) type for each Location IE, and wherein a change mark indication as a Location Payload Change Mark Indication (LP-CMI) indicating change of system information (SI) is included with the same unified common location information message,
wherein each of the other of the plurality of base stations is configured for transmitting the same unified common location information message according to a respective other predetermined schedule and other channel resource thereof.

2. The method of claim 1, further comprising:
controlling, by the processing device, transmitting the first location information over the network by broadcast, multicast, or unicast.

3. The method of claim 2, wherein the first location information is included in a System Information (SI) message when transmitted by broadcast.

4. The method of claim 2, further comprising:
controlling, by the processing device, when the first location information is transmitted by multicast, transmitting the first location information to predetermined client terminals of the network in a predetermined message having a predetermined periodicity and a predetermined logical channel, in which the predetermined message is configured such that the first location information is receivable and decodable only by the predetermined client terminals.

5. The method of claim 2, further comprising:
controlling, by the processing device, when the first location information is transmitted by unicast and a single predetermined client terminal receives service from the first base station, transmitting the first location information in a predetermined message addressing only the single predetermined client terminal.

6. The method of claim 2, wherein, when the first location information is transmitted by broadcast or multicast, the first location information is transmitted in a predetermined message having a periodicity according to whether transmission of the first location information is by broadcast or multicast.

7. The method of claim 2, further comprising:
controlling, by the processing device,
before transmitting the first location information, encrypting the first location information such that the encrypted first location information is decryptable only by predetermined client terminals in the network.

8. The method of claim 1, wherein each of the plurality of base stations is located in a predetermined tracking area and identified by a same Geographic Group Identity (GGID).

9. The method of claim 1, wherein at least two of the plurality of base stations have same or different Tracking Area Information (TAI).

10. The method of claim 1, further comprising:
controlling, by the processing device, the transmitting the same unified common location information message, by broadcast, multicast or unicast,
wherein the first base station is of a first subset of the plurality of base stations belonging to a first Radio Access Technology (RAT) and the plurality of base stations include another subset belonging to a second RAT.

11. The method of claim 1, further comprising:
controlling, by the processing device, transmitting the other location information respectively of the other of the plurality of base stations in a location information message not including the first location information of the first base station, by broadcast, multicast or unicast.

12. The method of claim 1, further comprising:
controlling, by the processing device,
receiving a request message from a client terminal of the network including a request for the first location information, and
transmitting a response message, responsive to the request message, (i) including the first location information or (ii) indicating the request is denied.

13. The method of claim 12, in which the receiving the request message and the transmitting the response message are authenticated according to a protocol of a Radio Access Technology to which the first base station belongs.

14. The method of claim 1, wherein each of the plurality of base stations transmits the same unified common location information message using a same LPCMI.

15. The method of claim 14, wherein at least one of the base stations belongs to a Radio Access Technology (RAT) different from a RAT to which another of the base stations belongs.

16. The method of claim 15, wherein second location information of a second base station of the plurality of base stations included in the same unified common location information message is received at the first base station via a core network of the network.

17. The method of claim 1, wherein each of the plurality of base stations is located in a predetermined tracking area and identified by a same Geographic Group Identity (GGID) and the plurality of base stations belong to different Radio Access Technologies (RATs), in which the first base station belongs to a first RAT, and
the method further comprising:
controlling, by the processing device, transmitting the same unified common location information message including second location information respectively of second base stations of the plurality of base stations belonging only to the first RAT.

18. The method of claim 17, further comprising:
controlling, by the processing device, when the LPCMI is updated based on addition of a new base station to or removal of a given base station from the plurality of base stations having the same GGID, transmitting the updated LPCMI in a periodic essential message.

19. The method of claim 18, further comprising:
controlling, by the processing device, transmitting, to a client terminal of the network, the GGID and a given LPCMI in one of a common or other essential message.

20. An apparatus for notifying first location information of a first base station of a wireless communication network, in which the network includes a plurality of base stations and the first base station is of the plurality of base stations, the apparatus comprising:
circuitry configured to control, at the first base station,
determining the first location information of the first base station based on location determination information from a location determination device of the first base station;
providing the first location information for communication to each other of the plurality of base stations in the network;
receiving, for the each other of the plurality of base stations, other location information respectively thereof; and
transmitting a same unified common location information message including the first location information and the other location information respectively of the other of the plurality of base stations, according to a predetermined schedule and channel resource of the first base station, in which the same unified common location information message indicates (i) a number K of Location Information Elements (IEs) within the same unified common location information message, each of the Location IEs indicating the position of a base station, and (ii) each of the Location IEs being associated with (a) given geographic location information corresponding to the each Location IE and (b) a number L of cells corresponding to the each Location IE and having the same given geographic location information, wherein the same unified common location information message identifies at least one radio access technology (RAT) type for each Location IE, and wherein a change mark indication as a Location Payload Change Mark Indication (LP- CMI) indicating change of system information (SI) is included with the same unified common location information message, wherein each of the other of the plurality of base stations is configured for transmitting the same unified common location information message according to a respective other predetermined schedule and other channel resource thereof.

21. A wireless communication device comprising:
a receiver to receive a wireless communication; and
a processing device configured for notifying first location information of the wireless communication device as a first base station of a wireless communication network, in which the network includes a plurality of base stations and the first base station is of the plurality of base stations, wherein the processing device is configured to control
determining the first location information of the first base station based on location determination information from a location determination device of the first base station;
providing the first location information for communication to each other of the plurality of base stations in the network;
receiving, for the each other of the plurality of base stations, other location information respectively thereof; and
transmitting a same unified common location information message including the first location information and the other location information respectively of the other of the plurality of base stations, according to a predetermined schedule and channel resource of the first base station, in which the same unified common location information message indicates (i) a number K of Location Information Elements (IEs) within the same unified common location information message, each of the Location IEs indicating the position of a base station, and (ii) each of the Location IEs being associated with (a) given geographic location information corresponding to the each Location IE and (b) a number L of cells corresponding to the each Location IE and having the same given geographic location information, and wherein the same unified common location information message identifies at least one radio access technology (RAT) type for each Location IE, and wherein a change mark indication as a Location Payload Change Mark Indication (LPCMI) indicating change of system information (SI) is included with the same unified common location information message, wherein each of the other of the plurality of base stations is configured for transmitting the same unified common location information message according to a respective other predetermined schedule and other channel resource thereof.

* * * * *